(12) United States Patent
Kurowski (10) Patent No.: US 12,483,582 B2
(45) Date of Patent: Nov. 25, 2025

(54) AUTOMATIC INFORMATION SECURITY RISK ASSESSMENT

(71) Applicant: FRAUNHOFER-GESELLSCHAFT ZUR FÖRDERUNG DER ANGEWANDTEN FORSCHUNG E. V., Munich (DE)

(72) Inventor: Sebastian Kurowski, Stuttgart (DE)

(73) Assignee: Disco Corporation, Tokyo (JP)

( * ) Notice: Subject to any disclaimer, the term of this patent is extended or adjusted under 35 U.S.C. 154(b) by 553 days.

(21) Appl. No.: 17/281,556

(22) PCT Filed: Oct. 1, 2019

(86) PCT No.: PCT/EP2019/076586
§ 371 (c)(1),
(2) Date: Mar. 30, 2021

(87) PCT Pub. No.: WO2020/070122
PCT Pub. Date: Apr. 9, 2020

(65) Prior Publication Data
US 2021/0367962 A1  Nov. 25, 2021

(30) Foreign Application Priority Data
Oct. 2, 2018 (DE) .................. 10 2018 216 887.3

(51) Int. Cl.
*H04L 9/40* (2022.01)
*G06F 21/57* (2013.01)

(52) U.S. Cl.
CPC ........ *H04L 63/1433* (2013.01); *G06F 21/577* (2013.01); *G06F 2221/034* (2013.01)

(58) Field of Classification Search
CPC .............. H04L 63/1433; G06F 21/577; G06F 2221/034
USPC ........................................................ 726/25
See application file for complete search history.

(56) References Cited

U.S. PATENT DOCUMENTS

| | | | |
|---|---|---|---|
| 9,608,855 B2 | 3/2017 | Someya et al. | |
| 9,680,855 B2 | 6/2017 | Schultz et al. | |
| 10,015,186 B1* | 7/2018 | Tamir | H04L 63/1433 |
| 2005/0193430 A1 | 9/2005 | Cohen et al. | |
| 2006/0021048 A1 | 1/2006 | Cook et al. | |
| 2006/0218640 A1* | 9/2006 | Lotem | G06F 21/577 |
| | | | 726/25 |
| 2008/0082380 A1* | 4/2008 | Stephenson | G06Q 10/06 |
| | | | 726/25 |

(Continued)

FOREIGN PATENT DOCUMENTS

| | | | |
|---|---|---|---|
| EP | 2 816 773 A1 | 12/2014 | |
| JP | 2009-070084 A | 4/2009 | |
| JP | 2016-143299 A | 8/2016 | |
| JP | 6253862 B1 | 12/2017 | |

OTHER PUBLICATIONS

Japan Patent Office, Notice of Reasons for Refusal in Japanese Patent Application No. 2021-518184 (Mar. 28, 2023).

(Continued)

*Primary Examiner* — Jacob Lipman
(74) *Attorney, Agent, or Firm* — MEAGHER EMANUEL LAKS GOLDBERG & LIAO, LLP (57) ABSTRACT

The invention relates to a method for the automatic assessment of information security risks, especially for the automatic assessment of information security risks in an information technology, IT, infrastructure, and to a corresponding system for the automatic information security risk assessment.

14 Claims, 3 Drawing Sheets

(56) References Cited

U.S. PATENT DOCUMENTS

| | | | | |
|---|---|---|---|---|
| 2015/0172309 | A1* | 6/2015 | Zandani | H04L 63/1466 |
| | | | | 726/25 |
| 2016/0205122 | A1* | 7/2016 | Bassett | H04L 63/1441 |
| | | | | 726/23 |
| 2016/0379326 | A1 | 12/2016 | Chan-Gove et al. | |
| 2017/0046519 | A1 | 2/2017 | Cam | |
| 2017/0171235 | A1* | 6/2017 | Mulchandani | G06F 21/554 |
| 2017/0286690 | A1* | 10/2017 | Chari | G06F 21/577 |
| 2020/0082094 | A1* | 3/2020 | Mcallister | G06F 8/77 |
| 2020/0097662 | A1* | 3/2020 | Hufsmith | H04L 9/0643 |
| 2020/0320191 | A1 | 10/2020 | Asai | |

OTHER PUBLICATIONS

Albrechtsen et al., "The information security digital divide between information security managers and users," *Computers & Security* 28(6): 476-490 (2009).

Baskerville, "Risk analysis as a source of professional knowledge," *Computers & Security*, 10(8): 749-764 (1991).

Pamula et al., "A weakest-adversary security metric for network configuration security analysis," *QoP '06: Proceedings of the 2nd ACM workshop on Quality of protection*, pp. 31-37 (Oct. 2006) URL: https://dl.acm.org/doi/10.1145/1179494.1179502.

Phillips et al., "A graph-based system for network-vulnerability analysis" *New Security Paradigms Workshop Proceedings*, Charlottsville, VA, Sep. 22-25, 1998, pp. 71-79.

German Patent Office, Office Action in German Patent Application No. 10 2018 216 887.3 (Jul. 16, 2019).

European Patent Office, International Search Report in International Application No. PCT/EP2019/076586 (Nov. 11, 2019).

European Patent Office, Written Opinion in International Application No. PCT/EP2019/076586 (Nov. 11, 2019).

International Bureau of WIPO, International Preliminary Report on Patentability in International Application No. PCT/EP2019/076586 (Mar. 23, 2021).

* cited by examiner

AUTOMATIC INFORMATION SECURITY RISK ASSESSMENT

CROSS-REFERENCE TO RELATED APPLICATIONS

This patent application is the U.S. national phase of International Application No. PCT/EP2019/076586, filed on Oct. 1, 2019, which claims the benefit of German Patent Application No. 10 2018 216 887.3, filed Oct. 2, 2018, the disclosures of which are incorporated herein by reference in their entireties for all purposes.

The invention relates to a method for automatically evaluating information security risks, in particular for automatically evaluating information security risks in an information technology (IT) infrastructure, and to a corresponding system for automatically evaluating information security risks.

Motivation

The evaluation of information security, which may also be understood within the scope of the described invention as an assessment, is an undertaking that must take into account the complexity of the considered information technology (IT) and (computer program) application networks and also the wide range of possible risk estimations. During the course of risk assessments, it is therefore necessary to identify possible damage scenarios or damage events, that is to say a possible amount of damage or a possible severity of damage, and corresponding probabilities. Accordingly, many approaches for risk assessment are focused primarily on reducing the complexity of the considered topology by aggregation and abstraction. The process of this aggregation or abstraction, however, is often only inadequately documented, and therefore poor decisions are not later traceable. The consequence of this is an under-assessment or over-assessment of risks and associated excessive or unimplemented measures for addressing risk or reducing the information security risk.

The interpretive nature of risk analyses results additionally from the fact that an amount of damage and probability of occurrence may be evaluated individually and differently (in this regard see R. Baskerville, "Risk analysis as a source of professional knowledge", in: Computers & Security, 10, 8 (1991), pp. 749-764). Whereas, depending on the type of infrastructure under consideration, there is great unity between the assessment of different amounts of damage, due to profession- and activity-related reasons, a different assessment of the probability of materialization of this damage results depending on the subjective horizon of expectation of the individual tasked with performing the assessment (see E. Albrechtsen and J. Hoven, "The information security digital divide between information security managers and users", in: Computers & Security, 28, 6 (September 2009), pp. 476-490). Due to the high degree of abstraction, these probabilities generally can only be documented and discussed in a manner that is difficult to trace. For example, the success of a certain network attack in an information technology (IT) network or the probability of the breaking open of an office door can be discussed on the basis of specific examples, whereas the probability of materialization, for example of the leaking of customer data, may be influenced by a wide range of factors and causalities, and correspondingly can only be discussed in a more complex and difficult way. As a result, the countermeasures taken are also heavily dependent on the background, expertise and priorities of the risk assessor in question and not on the actually existing possibilities for attack.

Risk analyses based on attack trees indeed allow a risk assessment for attack measures in an infrastructure, for example an IT network, however, these approaches are implementable only with a correspondingly high outlay in respect of documentation and analysis. These approaches are therefore unsuitable in the consideration of IT networks. Furthermore, the increased demand for risk-based information and data security approaches, as also required by legislative frameworks, such as the EU General Data Protection Regulation (EU-GDPR) or the German Federal Data Protection Act (BDSG), and by industrial frameworks, such as the VDA Information Security Assessment v4, has led to an exacerbation of the described problem. In the event that the infrastructure, for example of the IT network, is changed, it is necessary that the risk assessment be performed regularly as well as a re-assessment.

Technical Problem

Risk analyses, as described, are the underlying justification for any structured organizational implementation of the information security measures. Each purchase, each program, each measure is ultimately always justified by the addressing of an anticipated or evaluated risk to information security. In the present context, a risk includes the correlation between anticipated damage and its probability of materialization or occurrence.

The anticipated damage and probability of materialization are anticipated under application of a damage scenario or damage event. The probabilities of materialization, however, may vary greatly, because the underlying potential attack paths which may lead to the materialization of damage are generally diverse. For example, a leakage of customer data in a company could occur as a result of weaknesses in the IT network, the recruitment of staff, spear phishing, by the infiltration into the physical perimeter of the organization, or by a combination of these actions. All of these actions and combinations thereof may in each instance represent a separate attack path.

Previous Solution Approach

Current risk analysis approaches generally utilize top-down approaches, in which the probability of materialization is determined with varying degree of documentation and varying use of consensus among experts. This has the result, however, that the ascertained probability of materialization is heavily dependent on the preferences of the experts determining it, i.e., the risk assessors. Furthermore, traceable documentation in these approaches is associated with high outlay. These weaknesses are shared by all approaches, such as the Facilitated Risk Analysis Process (FRAP), NIST SP800-30, OCTAVE, or risk analysis approaches according to ISO/IEC 27005.

On the other hand, approaches exist which entail a high degree of formalization. For example, the preconditions leading to a damage event may also be documented by means of the Failure Mode Error Analysis (FMEA). This method, however, is only able to take into consideration attack paths in the form of abstracted preconditions of a damage event. Methods with an even higher degree of formalization, such as Fault Tree Analysis (FTA) or the modeling of attack trees or attack paths, are in each instance associated with an enormously high documentation effort.

The modeling of the attack paths, however, allows a sound, precise and traceable discussion of the probabilities, because it is not based on the probability of materialization of a damage event, but instead on the probability of success of an attack. The discussion therefore may be performed much more precisely and concisely and may be documented. For example, the probability that an attacker can pick a specific door lock of a specific make can be discussed more easily than the probability of the significantly more abstract leaking of customer data.

However, risk analyses (or risk evaluations) in companies do use this approach on account of the almost infinite documentation effort, and instead revert to abstract methods, such as FRAP, NIST SP800-30, OCTAVE or approaches according to ISO/IEC 27005. The reduced degree of formalization, however, has disadvantageous consequences:

Difficult traceability of changes

Changes to the considered topology, for example the IT infrastructure and/or the process or sequence structure and/or the building infrastructure and/or the threat level and/or implemented countermeasures or security measures may only be incorporated with to the high degree of abstraction. Due to the high degree of abstraction, there is a high risk of error. The consequences of these changes often cannot be taken into consideration.

Difficult traceability of risk estimations or evaluations.

Due to the high subjectivity of the approach, the estimations of the probabilities and therefore the estimations of the risk may fluctuate heavily between the individuals involved in performing the analysis. These estimations often are not traceable or are only traceable with difficulty and are very difficult to adapt.

In order to avoid this, EP 2 816 773 A1 uses attack paths in order to evaluate a risk. However, these attack paths relate exclusively to network elements. An attack step in an attack path therefore includes input and output information, for example IP and port, and the exploited vulnerability. These vulnerabilities are modeled in the network nodes. In addition, for the risk evaluation it is necessary to evaluate a quantitative degree of difficulty. The claimed approach does not require this, as discussed below.

U.S. Pat. No. 9,608,855 B2 also utilizes attack paths in order to evaluate a risk. This method, however, is dependent on quantitative measured values for damage and probabilities of materialization. The method is hereby limited, for example, to financial damage. Assertions regarding the risks therefore also require quantitative measured values. The claimed approach does not require this, as discussed below.

U.S. Pat. No. 2,006,021 048 A determines possible attack parts in which vulnerabilities are linked with network elements. The exploitation of the corresponding network elements may then be determined. Here, an attack path is the sum of all exploited vulnerabilities. A time-to-defeat value is then determined.

This method is unable to show attack path beyond network elements, i.e., for example the influence of properties of a door lock. In addition, the risk is not evaluated on the basis of the attack path.

U.S. Pat. No. 2,005,193 430 A uses information regarding vulnerabilities and an existing computer network in order to simulate potential attacks in said network. As a result, the probability with which an attack may be materialized due to the vulnerabilities is to be ascertained. Due to the assignment of vulnerabilities, however, the method is limited to weak points in IT networks and IT network components. The described method is used exclusively for the analysis of IT networks. In addition, the method may only cope with structural information in IT networks (connections between devices).

No attack paths are ascertained in U.S. Pat. No. 2,017,046 519 A. Rather, vulnerabilities in a network are detected. These are ordered in dependence on one another. A Hidden Markov Model is generated on this basis. A chain of vulnerabilities may thus then be used to evaluate a probability of attack. The patent, however, is hereby also limited to the use of specific vulnerabilities in IT networks.

The object of the invention is therefore to overcome the existing problems of known methods and to allow a flexible evaluation of risks that is easily adaptable to altered conditions. Within the scope of the present disclosure, the evaluation may also be understood as an assessment, that is to say may comprise or may be an assessment.

This object is achieved by the subject matter of the independent claims. Advantageous embodiments will become clear from the dependent claims, the description, and the drawings.

In order to address the described problem, an automated approach for developing attack trees, as well as an approach building on this for ascertaining the probability of occurrence or materialization of damage events or damage scenarios will therefore be provided hereinafter. The described approach is based on the finding that it is advantageous to separate the logic or assumptions of an attack, i.e., The attack logic, from the modeling of the topology forming the basis of the particular system under consideration or the particular infrastructure under consideration. The evaluation of the information security risks may hereby also be organized as a decentralized process, for example exchanged between companies or company parts, since for example the attack logic may be provided centrally by accordingly specialized IT security staff, more specifically independently of the topology to which it is then applied. As will be described in greater detail hereinafter, the described approach accordingly provides the following steps: modeling the topology, modeling the attack logic, modeling the risk assumptions, performing the risk analysis, that is to say evaluating the information security risk.

One aspect relates to a method for automatically evaluating information security risks in an infrastructure, in particular for automatically evaluating information security risks in an infrastructure which contains or is an information technology (IT) infrastructure, said method having a series of method steps. The infrastructure may thus comprise, in particular, an IT infrastructure and additionally an infrastructure different from the IT infrastructure, for example a physical infrastructure such as a building infrastructure. The IT infrastructure may comprise production cells, IT networks, and also software systems. A particular advantage of the approach described is therefore that the infrastructure for which the security risk is evaluated or assessed may comprise an infrastructure different from an IT infrastructure, whether this is in addition to or independent of the IT infrastructure.

A first method step is that of providing topology information to an evaluation unit, wherein the topology information defines a plurality of specified technical topology elements of the infrastructure, for example a door or a router, in each instance having at least one of a plurality of specified technical properties, for example a door lock of a certain type or a specific software running on the router or a version of the router. The property or properties allocated to the particular topology element may thus also be implicitly specified or defined by the type of topology element. Here, the type may relate to a kind, for example door or router, but also to a different version of an element of the same kind, for example router type A, router type B.

A further method step is that of allocating at least one damage event or damage scenario having a specified damage severity indicator value, which may represent an amount of damage, to at least one of the topology elements. A damage event or damage scenario may also include a plurality of individual damage events.

A next method step is that of providing attack logic information to the evaluation unit, wherein the attack logic information defines a plurality of specified technical attack steps. Here, each attack step represents a manipulation which is linked with corresponding properties which may be allocated to the topology elements. For example, an attack step "break open lock (type A)" is linked with the property "lock (type A)". An attack step of this kind may then comprise a probability of success, which is dependent on the property; for example, the probability of a successful attack step "break open lock (type A)" may be lower than the probability of success of an attack step "break open lock (type B)". Attack logics that already exist on the market and are therefore specified externally may also be used here and extended. An example of an already existing product is the MITRE ATT&CK matrix, which may be used as attack logic information. The externally specified attack logic, however, may be updated in a specified manner depending on individual preference, for example on the basis of existing vulnerability databases and/or information regarding up-to-date threats, as in Indicator of Compromise notifications.

Probabilities of success for each attack step of the attack logic may be defined as low, medium, high on the basis or in the form of predefined qualitative probability categories or classes. The probability categories or classes are preferably discrete probability categories or classes, for example n probability categories or classes, with n being a natural number.

The attack steps relate in each case to at least one of the plurality of specified properties, for example the lock, wherein the properties may be allocated in turn to specific topology elements and in each instance comprise a (preferably) qualitative probability of success, which is dependent in particular on the property or properties to which the particular attack step relates. Regardless of the topology information, an attack step library may thus also be produced, in which, regardless of the actual later use in the method, attack steps with corresponding probabilities of success are stored for a series of specified properties, for example different lock types of doors or different rooted types or different software components of a router and the like. During the generation of the attack paths, described further below, starting from the topology information on the basis of the properties specified there for the relevant topology elements, the matching attack steps may thus be selected automatically and taken into consideration in the automatic evaluation of the information security risk.

The attack logic is now used in order to run through the topology with the aid of algorithms for path searching in graphs. In this case, it is examined for each topology element whether the properties of the topology element correspond to the necessary conditions of the particular attack step of the attack logic. If this is the case, the attack steps following the current attack step (for example by AND, OR, in particular XOR, REQUIRED or MITIGATING link) are considered for the current and/or connected topology element. A connection between topology elements in this case represents a causal relationship therebetween. Such a causal relationship may be given, for example, by the network connection in an IT network between two IT systems, but also by the location of the IT system in a building, between IT system and building.

A further method step is that of specifying or defining a probability propagation method, in particular choosing one of a number of specified probability propagation methods, for combining the probabilities of success of attack steps that are linked with one another (for example via one or more topology element) or interact with one another (for example within a topology element). Attack steps interacting with one another, i.e., attack steps which for example are only made possible by another attack step, may also be referred to as attack steps that are mutually contingent. The specified probability propagation determines how the probability of logically linked attack steps is transferred to the required attack steps. The probability of success of required attack steps may thus be adapted iteratively. The adaptation is dependent here on the logical link. Here, a distinction may be made in particular between "AND" propagation and/or "OR" propagation, in particular also "EXCLUSIVELY OR" ("XOR") propagation and/or "MITIGATING" propagation and/or "REQUIRED" propagation. The "OR" propagation may be generated by a combination of "AND" and "XOR" and therefore does not have to be specified explicitly in the probability propagation.

By choosing or defining the probability propagation method, it is specified how the probabilities of success of the individual attack steps are calculated or assessed in the calculation, described further below, of the overall probability of a serial sequence of attack steps or of attack steps which are performable in parallel, which attack steps interact with one another. For example, it may be defined and thus selected that, for a probability of success which is present at a point of an attack path, for example in a topology element, a maximum security principle is selected, that is to say in each instance the greater probability of success of the preceding attack steps necessary in accordance with the attack path is taken into consideration (for example in the case of an "or" or "xor" propagation) or for example the different probabilities of success are multiplied or a mean value is formed for them (for example in the case of an "and" propagation). For example, it may also be defined and thus selected that for a probability of success which is present at a point of an attack path, for example in a topology element, the qualitative class of the probability of success is reduced or increased.

A preferred specified, in particular interchangeably specified, probability propagation is defined here such that probability categories or classes which do not represent the minimum or maximum of the available probability classes lead in combination to a progressive reduction of the probability classes, whereas for all further combinations the maximum principle of the probability of success of the preceding attack step applies. Furthermore, in this kind of probability propagation a progressive mitigation by long chains of attack steps is assumed and applies for the lowest and middle, but not the highest qualitative probability class. This will be explained in greater detail with reference to FIG. 4.

If, for example, a door A with lock of type A must be passed through before a door B with lock of type B can be passed and if the probability of success of getting past a lock of type A is low, whereas that of getting past a lock of type B is high, according to the maximum security principle the probability of success of passing door B would thus also be low, since, to do this, door A with a lock of type A would first have to be passed. Alternatively, for example, the mean value of the two probabilities of success for getting past the locks could also be formed and the calculated mean value could then be used subsequently as the relevant probability of success.

Lastly, a further step is that of automatically evaluating the information security risk by the evaluation unit. In this context, the term "automatically" may be understood to mean that, upon successful completion of the previously described method steps, no further input to the evaluation unit by an operator is necessary in order to obtain the estimated information security risk or a corresponding proposal for a technical adaptation of the infrastructure.

Here, part of the evaluation is a (preferably automatic) generation of multiple attack paths, in particular of all attack paths possible logically and/or in combination, or at least of one attack path on the basis of the provided topology information and the provided attack logic information. An attack path links at least one topology element and a further topology element by at least one attack step which relates to the specified properties of the topology elements of the attack path. An attack path may also describe the probability of success with which an attacker may pass from one topology element to a further topology element linked with the first topology element via a corresponding attack step. An attack path may also comprise a series of attack steps which link a series of topology elements.

Attack paths may also cross one another or merge with one another, for example if an attacker first has to pass through a publicly accessible door by way of an attack and then into a room located behind the door, in which room, for example, there is a router, so as to be able to perform a certain further attack step there which requires the physical presence of the attacker at the location of the router. Accordingly, attack paths may also split, for example if the attacker, once at the location of the router as in the described example, either hacks there into a computer on which sensitive data are saved or moves physically from the location of the router to the location of the computer and reads the sensitive information there.

Part of the automatic evaluation is also a preferably automatic examination of the produced attack paths to ascertain whether the attack path in question relates to a topology element to which a damage event has been allocated. This may be implemented on the basis of a specified specification format for the properties of the topology elements, which for example comprise the type of the topology element, version of the type, and counter measures existing for attacks on the type. In the event of a positive result of the examination, in particular only in the event of a positive result of the examination, a preferably automatic calculation may then be performed in accordance with the selected probability propagation method in order to calculate a probability of occurrence or overall probability of the damage event of the topology element affected by the attack path, depending on the probabilities of success of the attack steps which are necessary in accordance with the particular attack path, or the particular attack paths affecting the topology element having the allocated damage event. The calculation can be performed with a recombination and/or a contingent classification (discrete increase, discrete reduction, maintenance) of the classes of probability of preceding attack steps depending on the logical linking of the preceding attack steps and/or the chain length of preceding attack steps. The calculated overall probability may be, in particular, a qualitative and/or discrete overall probability. Once the probability propagation has been performed over all attack steps of an attack path linked with a damage event or scenario, the resulting overall probability of the attack step (the attack step linked with the damage event and relating to the topology element) may be transferred to the damage event. A general tendency in the evaluation may thus be influenced via the choice of the probability propagation, for example probabilities of success that tend to be higher are taken into consideration more heavily than those that are lower, or vice versa.

Furthermore, part of the automatic evaluation is a preferably automatic output of the estimated information security risk depending on the calculated overall probability and the severity of damage indicator value. The estimated security risk may also be understood to be an assessed qualitative security risk or may be such a risk. For example, the information security risk may be evaluated and output as proportional to a product of the overall probability with the severity of damage indicator value. The output may comprise a display on a display means, a storing on a data carrier, or another provision means.

Alternatively or additionally to the output, the automatic evaluation and/or assessment may also comprise a preferably automatic proposal of one or more properties of one or more topology elements for a technical adaptation and/or a preferably automatic adaptation of one or more properties of one of the plurality of topology elements in order to reduce the information security risk. Such measures may be referred to as a safeguarding of the infrastructure. For example, this may be implemented by providing a library of counter measures, which are linked to particular attack steps, such as an updating of a firmware and/or software of a router as topology element. For example on the basis of the attack steps for which the probability of success contributes most to the overall probability, the evaluation or assessment unit may then propose or initiate one or more counter measures which consequently contribute most heavily to reducing the overall probability and thus the information security risk.

At least one of the described method steps, that is to say one, more or all described method steps, may be performed on a computer.

This approach solves the problem described at the outset by differentiating the modeling of the attack steps and thus of the attack logic (what must an attacker do to reach a target) from the modeling of the topology (to what might a step relate).

This has the advantage that IT security experts are able to model generic attack steps and thus attack paths. The probabilities of success of the attack steps are defined within the generic attack steps or attack paths. The modeling of the topology may then be performed for example by specific specialist areas. The generic attack steps are then applied to the modeled topology with the aid of the proposed method. Here, it is checked whether an attack step may be applied at a specific moment in time to an element of the topology (for example, the guessing of passwords may be applied only to elements of the topology that are password protected or the picking of a lock may be applied only to elements that have a lock). If this is the case, a corresponding attack path is established. If this attack path leads to a damage scenario, this attack path may thus be further considered for the evaluation of the information security risk, for example may be saved and displayed. The evaluation unit in this case examines the created attack paths and determines the overall probability for the damage event or scenario from the probabilities of success of the applied attack steps. The following thus result once the method has been performed:

Attack paths which are relevant under the current assumptions (for example via generic attack paths).

The modeled (generic) attack paths show the assumptions under which the analysis has been performed. If, for example, only information technology attacks or only physical attacks are assumed, this is reflected in the attack paths. The attack paths created from the analysis then show the attacks actually relevant to the topology and may be used to choose and prioritize counter measures.

Information security risks that are relevant to the current topology with the current counter measures.

The automatic development of relevant attack paths, and the determination of the probability of success of an attack, or overall probability, may be used jointly with the assumed amounts of damage to display the information security risks.

Since the modeling of the topology is separated from the modeling of the attack steps, this method may be performed with a lower outlay. Due to the automated determination of the applicable attack paths, the modeled attack steps (for example in the form of generic attack paths) may be re-used, thus reducing the effort further and increasing flexibility.

Furthermore, the method thus traceably shows the possible kinds of materialization of a risk and also the determined probability or materialization or overall probability. Changes to the (generic) attack paths, for example due to changes in the threat landscape, or changes in the topology and counter measures may be traced directly in the relevant models. Their influence on the change in the determined risks and attack paths is directly evident.

The described approach is not dependent on the exact quantitative statement in respect of the amount of damage and probability of success of an attack, and instead is able to work with only qualitative damage and probability classes (which are often subjectively influenced, as described above). This allows the use of the method beyond IT networks and for the consideration of purely financial damage. The method may thus be applied in heterogeneous applications, such as production systems and smart cities. The method may also be used for directly measurable and at the same time also for indirect non-measurable expected damage (for example reputation damage).

The method thus offers:
1. An automated method for attack path-oriented risk analysis which, with little outlay, is able to display traceable risks and changes to these risks by changes in the topology, threat landscape, counter measures, or changing assumptions of the risk analysis.
2. A method which allows the automated probability assessment—in particular with qualitative probabilities of success—of attack trees formed by the attack paths.
3. A method that allows work sharing and substantive work in the risk analysis and the prioritization of security measures since security-specific modeling aspects of topology-specific and specialist modeling aspects are separate.
4. A method which is able to be easily integrated in existing risk analysis approaches.

In comparison to the previously known methods, the described approach thus offers the following advantages:

Increase in Traceability and Accountability of Risk Evaluations or Analyses

Due to the described method, the topology and assumptions of the risk analysis, that is to say assumptions regarding the attack logic and risk assumptions are separated from one another, whereas in previous methods they are jointly documented generally in text form. This separation makes it possible to attribute created attack paths, and therefore the basis of the decision of the risk analysis, to changes in the attack logic, the risk assumptions, or the topology in isolated form. Newly created attack paths and effective counter measures associated therewith may thus also be clearly reasoned.

Transferability of Results

Since the subject matter under consideration, that is to say the topology which, for example, describes an infrastructure, and the assumptions, that is to say in the present case the attack logic and the risk assumptions, are modeled separately from one another, results may be transferred. Identical topologies may thus be analyzed using the same topology model. The modeled attack logic may be used in turn for various topologies. For example, a company-wide attack logic may thus be modeled and documented by a central business unit or an external service provider or an individual person. This logic may then be provided for analysis to the person responsible for the topology, for example a service owner. Lastly, the modeling of the risk assumptions allows the comparison and the refinement of existing approaches, such as the implementations of ISO/IEC 27005, NIST SP800-30, or OCTAVE.

Reduction of the Response Time in the Event of Environment and Substantive Changes By separating the different modeling aspects and by the automated generation of an attack path, the risk analysis or risk evaluation may be performed preventively or ad-hoc according to environment or substantive changes. The attack logic may thus be adapted, for example in the case of newly created attacks or exploits or the increasing spread of WiFi auditing platforms. Newly created attack paths and changing risks, for example by an increase in the probability of materialization of a damage scenario, may now be determined automatically. For example, trigger events may thus be provided, which start the automatic evaluation of an information security risk by the evaluation unit, for example when updated attack logic information is provided.

The same is true for the modeling of new weak points in the topology or for changes by addition or removal of topology elements or topology connections. For example, when re-letting an additional building, the topology information may thus be automatically updated, and the information security risk may be re-evaluated automatically as the updated topology information is provided. Due to the automatic execution and the possibility to model changes separately in the topology information and the attack logic information, the risk of environment or substantive changes may be evaluated more quickly, more economically and more easily. It is thus possible for the information security to respond to these changes more quickly.

Drastic Reduction of the Efforts for Performing a Risk Evaluation or Risk Analysis Current approaches for carrying out a risk analysis, such as the NIST SP800-30, OKTAVE, FRAP or implementations of ISO/IEC 27005, currently provide either the bringing together of experts from different business areas outside the information security, the holding of multiple meetings, or the creation of multi-page documents. The described method merely requires a continuous adaptation of the attack logic and an adaptation or, upon introduction, a first-time modeling of the topology under consideration, for example of a building structure and/or an IT infrastructure. A continuous execution of the analysis is hereby possible economically and in a manner in which the work is shared out.

The approach thus differs significantly for example from EP 2 816 773 A1 since the logical dependency between attack steps is modeled, with an attack step possibly being an act or manipulation which may be applied in the presence or absence of certain properties of a topology element. Besides possible weak points or vulnerabilities, these properties include also the existence of a specific version, or the absence or presence of a specific security measure. A vulnerability or the like is not at any point assigned to the topology elements; rather this occurs in a manner decoupled from the topology elements via the specification of attack steps in the attack logic information.

On the one hand, it is hereby possible to share out the work (topology is modeled separately from the attack steps). On the other hand, the method is thus not only limited to network elements, but may also comprise building elements or other infrastructure elements, for example. An attack path in the described method is not the amount of utilized weak points of the network elements, but instead the amount or linking of possible attack steps to elements of any kind of topology, in particular any kind of infrastructure. Since the method may determine all attack paths, without vulnerabilities having to be set in relation to one another for this purpose, the method is also not limited to IT networks.

It is thus possible, with the method described here for example, to show (additionally or alternatively) the physical infiltration into a security area by tracking a worker and the subsequent installation of malware. Furthermore, the described method may take into consideration the communication between network elements and (IT) services. For example, the exchange of account data between IT components over various sub-networks may also thus be shown. In addition, the described approach for risk evaluation does not require an evaluation of a quantitative degree of severity, since in the present case qualitative risks may be evaluated in accordance with freely definable specifications.

Due to the assessment of qualitative risks, the method is not limited to financial damage and quantitatively measurable probabilities (such as U.S. Pat. No. 9,608,855 B2). The method may hereby be used both for objectively measurable and non-objectively measurable direct and indirect damage. Probabilities of success of attack steps are also often not meaningfully quantifiable, but merely describable with qualitative probabilities of success. Organizations hereby usually use qualitative risk analyses when dealing with information security risks. Due to the use of qualitative probabilities of success, the method may be easily integrated in existing risk analysis approaches in organizations and may be interpreted in accordance with the existing, conventional definitions.

In accordance with an advantageous embodiment the topology information is provided independently of and/or separately and/or distinctly from the provision of the attack logic information. As also described above at the outset, this has the advantage of the increased flexibility and the reduced adaptation outlay in the event of changes in the topology or possible attacks. In this embodiment the provision in question may also be implemented via a web service, whereby the provision of the attack logic information may be fully separated locally. This increases flexibility and usability of the method.

In another advantageous embodiment, it is provided that the topology information represents an information technology network with at least one router and/or at least one computer as topology elements, and/or a cable harness, in particular with at least one connection and/or a branch point as topology elements, and/or a building complex which may comprise a single or also multiple buildings, in particular with at least one room and/or a door and/or at least one corridor as topology elements, and/or a computer (or application) program network, in particular with at least one computer (or application) program and/or a computer (or application) program interface as topology elements, and/or another product, for example a hardware product and/or a software product or generally a product that can be displayed as a graph, for example a motor vehicle, in particular with at least one product component as topology element. The topology information may also represent an IT services network and/or organizations and/or organization units and/or a socio-technical information system, for example with applications (or application programs) as topology elements. The topology information (in particular in addition to topology information representing an information technology network) particularly preferably comprises topology information which is different from topology information representing an information technology network.

This has the advantage that the described flexibility in respect of the reference topology is utilized and an information security risk for different infrastructures or products forming the basis of the topology information, as well as combinations of qualitatively different infrastructures, in particular when they are interwoven with one another, may be used.

In a further advantageous embodiment it is provided that the properties of the topology elements represent a specified, in particular technical weak point and/or a type description, for example a version umber and/or a system type, and/or a presence or absence of a specified security measure. This has the advantage that the attack steps may be allocated particularly effectively to the properties and thus indirectly to the topology elements.

In a particularly advantageous embodiment it is provided that the topology information is processed by the evaluation unit (preferably automatically) in that, starting from the topology elements of a specified type, for example with specified properties such as a door that is publicly accessible, a depth-first search and/or breadth-first search and/or a known similar or equivalent search method is performed over one or more, preferably all, other topology elements until all combinations with the topology elements of the specified type, which may also be just one single topology element, have been examined in respect of their validity under consideration of the attack logic information. In this case, a combination is valid if the particular topology elements of the combination are linkable via attack steps which each relate to at least one of the properties of those topology elements that they link.

Accordingly, when the attack paths are generated by the evaluation unit, the attack paths are generated in accordance with the valid combinations and not the invalid combinations. Proceeding from the one or more topology elements of the specified type, it is thus examined which attack step is possible in which topology element (initially of the specified type) and which further topology element may be attacked from there with the matching attack step. The valid combinations thus comprise a series of topology elements, from which it is possible to pass through attacks matching the particular topology elements to the following topology element in the combination or series. For example, an attacker may thus pass through a door in a public area by picking the lock of the door as attack step and may enter a private space located behind the door, where he may then possibly perform further attack steps to further topology elements.

This has the advantage that the number of possible combinations of topology elements which correspond to real threat or damage scenarios are filtered out and calculated, such that the efficiency of the method as whole increases.

It is provided that each attack step represents a manipulation which may be performed in or on the corresponding topology element in the presence or absence of the property or the properties of the topology element to which the attack step relates. In particular, each attack step is allocated an attack origin, which denotes which property or properties a specific topology element (topology node) of an attack path must have so that the corresponding attack step may be performed in or on the one topology element and therefore may be linked with the specific topology element as part of the attack path, wherein the stated attack path links the specific topology element and a further topology element by the stated corresponding attack step. Alternatively or additionally, each attack step may also be allocated an attack goal, which denotes which property or properties must have a further topology element of the attack path so that the corresponding attack step may be linked with the further topology element as part of the attack path and/or which denotes which damage event must be allocated to the specific or further topology element so that the attack step may trigger the damage event with the allocated probability of success.

This has the advantage that the attack paths may be specified particularly efficiently and independently of the topology as such. Due to the allocation of attack origin and attack goal, the topology elements eligible for an attack path are also clear on account of their corresponding properties and are thus linked with one another particularly efficiently such that the method may be performed particularly quickly.

In a further advantageous embodiment it is provided that a number of probability propagation methods for combining the probabilities of success of linked attack steps are specified and comprise an "AND" propagation and/or an "OR" propagation and/or an "EXCLUSIVE OR" ("X-OR") propagation and/or an "EXCLUSIVE OR" ("X-OR") propagation and/or a "MITIGATING" propagation and/or a "REQUIRED" propagation. Here, probability propagation may denote the adaptation of the probability of attack of an applied attack step (applied to a topology element) under consideration of the probabilities of preceding attack steps or preceding combinations of attack steps in a determined attack path. The actual probability of occurrence of the attack steps on the topology elements and lastly the probability of success of an attack path may be evaluated in this way. For example, in the case of an "AND" propagation, a plurality of preceding attack steps must occur in order for the attack path to be successful. By contrast, in the case of an "OR" propagation, it may be sufficient if one of the preceding attack steps occurs in order for the attack path to be successful. Lastly, in the present case, in the case of an "EXCLUSIVE OR" propagation the corresponding attack steps are mutually exclusive. Different propagations may also be combined in one attack path. In a "REQUIRED" propagation a specific attack step is possibly only if another attack step was successful beforehand. Lastly, in the case of a "MITIGATING" propagation, the probability of success of an attack step may lastly be defined depending on the length of the preceding chain of the contingent attack steps, and also their probabilities of success (in particular in the form of probability of success classes, i.e., in brief: "and their probability of success classes").

It may thus be provided that the probability of the damage event or scenario is defined iteratively on the basis of the iterative adaptation of the probabilities of success of the attack steps leading to the damage scenario and also the preceding mutually contingent attack steps depending on the logic link of the attack steps and also the length of the attack steps determining the chain.

This has the advantage that a general tendency of the over-estimation or under-estimation of an information security risk may be selected with low outlay.

In a further embodiment it is provided that the topology information and/or the attack logic is provided as a graph. This has the advantage that the attack paths may be created particularly efficiently; in particular a depth-first and/or breadth-first search may be performed particularly efficiently. The depth-first/breadth-first search may be understood here to be the known DFS (depth-first search) or BFS (breadth-first search).

In a further advantageous embodiment it is provided that the automatic evaluation is performed automatically at specified time intervals and/or once updated topology information has been provided and/or once updated attack logic information and/or once another trigger criterion has/have been provided. This has the advantage that the risk evaluation is automatically kept in the current state, that is to say is not outdated and always delivers a relevant estimation.

A further aspect relates to a computer program or computer program product which comprises commands which, when the program is run by a computer, prompt the computer to perform the automatic evaluation in one of the described embodiments. In addition, the computer program product may also prompt the computer to provide the topology information and/or to allocate the damage event and/or to provide the attack logic information and/or to choose a probability propagation method. The resulting advantages correspond to the previous comments.

An additional aspect relates to a method for safeguarding an infrastructure, in particular an infrastructure with an information technology network and/or a building complex and/or a computer program network, with one or more of the above-mentioned method steps, with the additional method step of a safeguarding of the infrastructure. The infrastructure may comprise, in particular, an infrastructure different from an information technology (IT) infrastructure, that is to say at least one element not belonging to an IT infrastructure.

The safeguarding may include a selection of at least one of the topology elements, the adaptation of which provides or allows a maximum reduction of the estimated information security risk, and may also include an indication of the selected topology element. The adaptation may include an update and/or a replacement. The topology element or the topology elements with the maximum reduction of the estimated information security risk may be selected, for example, in that relevant probabilities of success are varied in the generated attack paths, the information security risk is evaluated for the varied probabilities of success, and the topology element that is allocated to the probability of success of which the variation has caused the greatest reduction of the evaluated information security risk is selected. At the time of the selection, a specified outlay linked with the adaptation (for example via a stored database) may also be taken into consideration. For example, it may be quicker and easier to replace a door lock than to update a router.

The safeguarding may include a safeguarding of the infrastructure on the basis of the output estimated information security risk and/or with an adaptation, in particular update or replacement, of the indicated topology element.

Another aspect relates to a system for automatically evaluating information security risks, in particular for automatically evaluating information security risks in an information technology infrastructure.

The system in this case has a first provision unit for providing topology information which defines a plurality of specified topology elements each having at least one of a number of specified properties, and also an allocation unit for allocating at least one damage event with a specified severity of damage indicator value to at least one of the topology elements. Furthermore, the system has a second provision unit, preferably different from the first, for providing attack logic information which defines a plurality of specified attack steps, wherein the attack steps relate in each instance to at least one of the plurality of specified properties and in each instance comprise a probability of success. The system also comprises a selection unit for defining a probability propagation method (or for selecting one of a number of specified probability propagation methods) for combining the probabilities of success of attack steps linked with one another or interacting with one another, and an evaluation unit for automatically evaluating an information security risk.

In this case, the evaluation unit is designed to generate multiple attack paths on the basis of the topology information provided by the first provision unit and on the basis of the attack logic information provided by the second provision unit, wherein an attack path links at least one topology element and a further topology element by at least one attack step, which relates to the specified properties of the topology elements in the attack path. The evaluation unit is furthermore designed to examine the generated attack paths to ascertain whether the attack path in question involves a topology element to which a damage event has been allocated, and, in the event of a positive result of this examination, to calculate an overall probability for the damage event depending on the probabilities of success of the attack steps in accordance with the selected probability propagation method. Lastly, the evaluation unit is also designed to output the estimated information security risk depending on the calculated overall probability and the severity of damage indicator value.

Advantages and advantageous embodiments of the described system correspond here to advantages and advantageous embodiments of the described method.

The features and combinations of features described above in this description, and also the features and combinations of features described hereinafter in the description of the figures and/or shown in the figures are applicable not only in the indicated combinations, but also in other combinations, without departing from the scope of the invention. Embodiments of the invention that are not explicitly shown in the drawings or explained, but which result and may be produced from separated combinations of features from the explained embodiments are thus also considered to be included and disclosed. Embodiments and combinations of features that do not contain all the features of an independent or dependent claim as originally drafted are therefore also considered to be disclosed. Embodiments and combinations of features that go beyond or deviate from the combinations of features presented in the dependency references of the claims, in particular by the descriptions provided above, are additionally considered to be disclosed.

TECHNICAL FIELD OF APPLICATION

The method may be applied in the evaluation of information security risks. This may be used as a refining method, for example in company-wide, abstract risk analysis approaches, such as NIST SP800-30, ISO/IEC 27005, OKTAVE or FRAP, and in security management approaches such as the IT baseline protection, ISO 27001 or NIST SP800-53. The refinement may be performed here at any one consideration level or over different consideration levels. Both a consideration of all company aspects and also the isolated consideration of individual aspects, for example of an IT infrastructure, is thus possible. For this reason, the method may also be used as the only method for a, for example, company-wide analysis and assessment of risks.

BRIEF DESCRIPTION OF THE DRAWINGS

Embodiment examples of the invention will be explained in greater detail hereinafter on the basis of schematic drawings. In the drawings.

DETAILED DESCRIPTION OF THE INVENTION

Like or functionally like elements are provided with like reference signs in the various figures.

Figure 1:
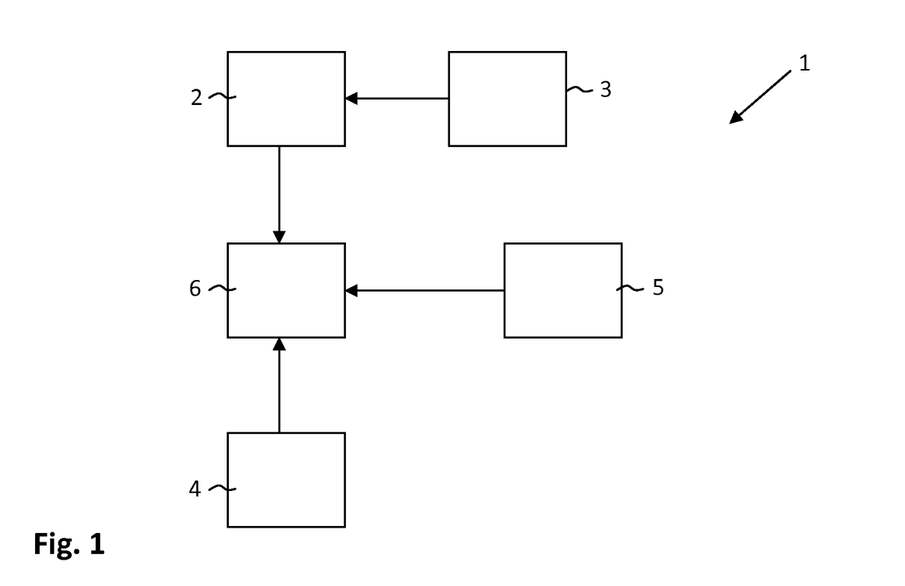
FIG. 1: illustrates an exemplary embodiment of a system for automatically evaluating information security risks.

FIG. 1 shows a system 1 for automatically evaluating information security risks, comprising a first provision unit 2, an allocation unit 3, a second provision unit 4, a selection unit 5, and an evaluation unit 6.

The first provision unit 2 is in this case designed to provide topology information, wherein the topology information defines a plurality of specified topology elements each having at least one of a number of specified properties. The allocation 3 is designed to allocate at least one damage event having a specified severity of damage indicator value to at least one of the topology elements. In the present case, the allocation unit 3 is coupled to the first provision unit 2, however, it may also be coupled directly to the evaluation unit 6.

The second provision unit 4 is deigned to provide attack logic information, wherein the attack logic information defines a plurality of specified attack steps, wherein the attack steps in each instance relate to at least one of the plurality of specified properties and in each instance comprise a probability of success.

The selection unit 5 is designed to select one of a number of specified probability propagation methods for combining the probabilities of success of attack steps that are linked with one another or interact with one another.

The evaluation unit 6 is lastly designed to generate multiple attack paths on the basis of the topology information provided by the first provision unit 2 and on the basis of the attack logic information provided by the second provision unit 4, wherein an attack path links at least one topology element and a further topology element by at least one attack step, which relates to the specified properties of the topology elements in the attack path. Designed, and to examine the generated attack paths to ascertain whether the attack path in question involves a topology element to which a damage event has been allocated, and, in the event of a positive result of this examination, to calculate an overall probability for the damage event depending on the probabilities of success of the attack steps in accordance with the selected probability propagation method, and lastly to output the estimated information security risk depending on the calculated overall probability and the severity of damage indicator value.

Figure 2:
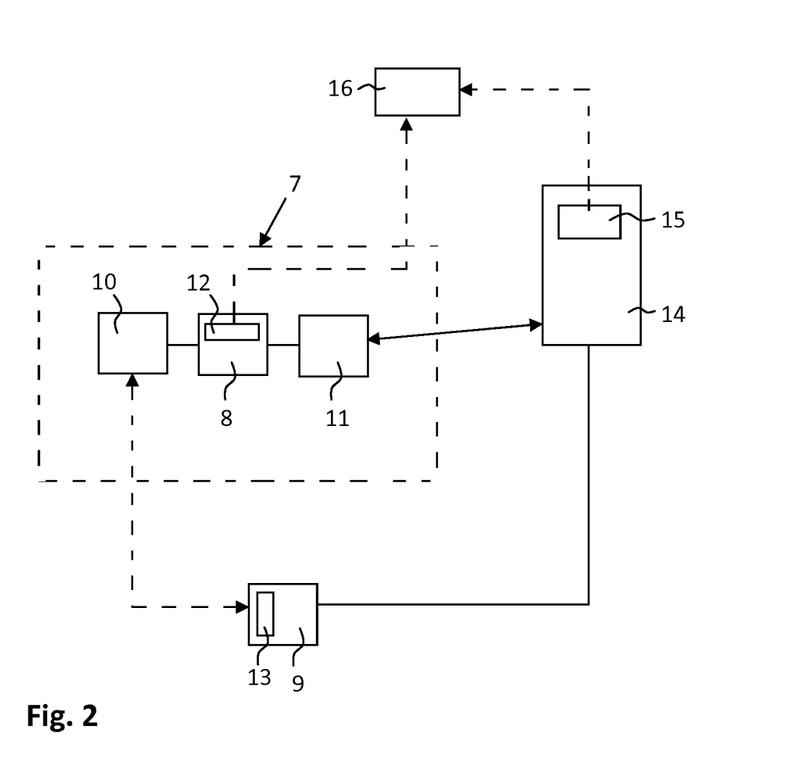
FIG. 2: illustrates an exemplary structure of an attack logic with its relation to an associated topology element.

FIG. 2 shows the relationship between an exemplary item of attack logic information 7, which in the shown example, for reasons of clarity, comprises merely a single attack step 8, in its interaction with en exemplary topology element 9. The attack logic information 7 in this case comprises the attack step 8, which in the present case is associated with an attack origin 10 as well as an attack goal 11. The attack step 8 in this case also comprises a probability of success 12. The attack step 8 is linked by means of the attack origin to the topology element 9 via a property 13. In the present case a damage event 14 is allocated to the topology element 9. The damage event 14 in this case has a severity of damage indicator value 15. In the shown example, the attack step 8 is additionally linked with the damage event 14 by the attack goal 11, which in the present example is allocated to the attack step 8. This damage event 14 is in turn linked with the estimated information security risk 16 by means of the severity of damage indicator value 15.

To model the attack logic 7, in the shown example a distinction is therefore made between the possible origin of an attack, i.e., the attack origin 10, the attack step 8 initiated thereupon, the (intermediate) attack goals 11 materialized in the short term, and the damage event or damage scenario 14 possibly effected. In the present case, the attack origin 10 is the most basic assumption for an attack. It indicates in which logical or physical position an attacker must be in order to perform the first step of an attack 8. Accordingly, an attack origin 10 may be applied to all elements 9 of a considered topology having a specific property 13 or alternatively to specific topology elements 9. In the latter case, the corresponding attack origin 10 is associated with a specific topology element 9.

The attack step 8 always relates here to one or more specific property 13 of the topology elements 9. Attacks may hereby also be modeled over various kinds of topology. The attack step 8 is also associated here with at least one attack goal 11. The attack goal 11 indicates which (intermediate) goals may follow an attack step 8. These (intermediate) goals may be provided with conditions that either must apply or not apply exclusively or must apply or not apply jointly with other conditions so that the particular (intermediate) goal may be achieved.

For example, an attack goal 11 of an attack 8 may presuppose another attack, which also must be performed or must be performed beforehand. In addition to the (intermediate) goal, a probability of success 12, which may also be referred to as a probability class, is also associated here with the attack step 8 and thus with the attack goal 11. This probability of success 12 shows, for example, a qualitative, ordinally scaled probability with which the achievement of a (intermediate) goal after the given attack step 8 is expected. A number of (intermediate) goals may also be combined via logical operators. If the associated (intermediate) goals occur in accordance with the selected logical operator, the attack step associated with the logical operator then follows. A (intermediate) goal, however, may also be accompanied by the materialization of a damage event 14. A damage event 14 is in this case allocated to at least one topology element 9 and is associated with a, in the present case, qualitative ordinally scaled amount of damage, i.e., the severity of damage indicator value 15, or impact class.

In the modeling of the attack logic, a further component may additionally also be used, which extracts new attacks from sources, such as from RSS Feeds, Security Incident and Event Monitoring systems (SIEM) or databases relating to vulnerability and exploits, such as the National Vulnerability Database (NVD), Common Vulnerabilities and Exposures (CVE) and others, and processes them for annotation. This further component may extract the (intermediate) goals, attributes relating thereto, preceding (intermediate) goals and attack steps via Natural Language Processing (NLP) methods. These may then be incorporated by the user into the available attack logic. Lastly, the attack logic is preferably stored as a graph in a database.

The described approach allows the manual modeling of a topology of different degrees of abstraction, also over various topology levels. Since the modeled (intermediate) goals of an attack logic are freely applicable to selectable attributes, the characteristics of the attributes in the various topology elements are also freely selected. This is also true for the attack origins and attack steps. The topology elements may thus be freely defined as required. For example, such topologies which may be modeled are IT networks, applications in an organization, rooms, corridors, doors and the like, organizations, organization units, cable harnesses, product components, and a combination of various layers of the mentioned individual topologies. This list is not exhaustive.

In addition, provided topology information and thus the provided topology may be processed by a semi-automatic component. Provided information sources, such as network plans, application topologies, room and building documentation or Configuration Management Databases (CMDB) may be used here to extract the corresponding topology elements. Furthermore, the semi-automatic component may use information from CERT RSS feeds, SIEM systems or vulnerability databases such as Full DB, NVD, CVE, etc. in order to update provided topology elements in respect of newly discovered properties and thus potential attacks on the provided topology element and in order to create new steps in the attack logic. The modeled topology is stored as a graph in a database, so that the topology information contains said graphs.

Since the approach of the method moves away from multi-layered abstracting approaches and offers a detailed risk analysis with limited outlay, the integration in abstract approaches applied company-wide, in particular with regard to communication with third parties, company partners, management or auditors, is advantageous. In order to ensure this communication, the method provides that the qualitative ordinally scaled variables which are routine in modern risk analysis approaches are used for the probability (probability class) and the severity (impact class) of a risk. The risk (risk class) calculated from the probability and severity may be used here in routine approaches, such as risk matrices, presented in company-wide risk approaches.

Due to the use of qualitative, ordinally scaled variables, a risk evaluation may be performed along the generated access paths, usually in a non-mathematically verifiable manner. For example, specifications regarding the quantitative combining of fault materialization probabilities in AND or OR or EXCLUSIVE OR links exists with DIN 25424-2:1990-04; a direct transfer of these approaches to ordinally scaled variables, however, is not possible mathematically and may falsify the conclusion of the analysis depending on the manifestation, validity, traceability and amount of ordinally scaled variables (see DIN 1990: Fault tree analysis, manual calculation procedures for the evaluation of a fault tree (Technical Report, #DIN25424-2:1990:04.DIN).

Therefore, for example, company-specific assumptions regarding the probability propagation may be selected and displayed with the present method. To this end, a distinction may be made between the AND, OR, XOR (exclusive OR), REQUIRED and MITIGATING cases. The assumptions regarding probability propagation may now be used by specialization of the corresponding class propagations, or propagation class, AND, REQUIRED, MITIGATING (, OR) and XOR. During the automated risk analysis, the corresponding specializations may be loaded by the probability propagator and used for probability propagation. In addition, in each of the specialized classes, or propagation classes, AND, (OR and) XOR, REQUIRED and MITIGATING, the class that is to be used if any (intermediate) goals are not linked by logical operators may be determined.

This allows extensive flexibility of the probability assessment of determined attack paths. Examples of the probability propagations may be multiplication, means for forming and rounding the scale values in the case of AND, and use of the maximum principle in the case of OR and XOR. Further examples are the minimum principle, progressive reduction, or progressive increase of the probability class.

Automatic Preparation of Logic Information Flows in Static Networks

Depending on the given topology or topology information, it may possibly be necessary to extract logic sequences from static structures. This is the case, for example, when considering an IT network diagram. Logic sequences in such a network may show which components or topology elements communicate with one another on account of given filter and routing rules in different layers, for example OSI layers. This is necessary, for example, in order to be able to apply the establishment of man-in-the-middle attacks in the attack logic to a given topology.

In this case, the method may provide the additional association of a topology element with an Information Flow Center or an Information Flow Controller. If the topology element is a topology element associated with an Information Flow Controller, the association thus indicates that the corresponding element controls information flows. This may be provided, for example, by a firewall, a static routing table, or a switch.

Depending on the given topology or topology information, it may possibly be necessary to extract logic sequences from static structures. This is the case, for example, when considering an IT network diagram. Logic sequences in such a network may show which components or topology elements communicate with one another on account of given filter and routing rules in different layers, for example Open System Interconnection (OSI) layers. This is necessary, for example, in order to be able to apply the establishment of man-in-the-middle attacks in the attack logic to a given topology.

In this case, the method may provide the additional association of a topology element with an Information Flow Center or an Information Flow Controller. If a topology element is a topology element associated with an Information Flow Controller, the association thus indicates that the corresponding element controls information flows. This may be provided, for example, by a firewall, a static routing table, or a switch. The corresponding rules with which the information flow is controlled may be stored in a filter attribute. If, by contrast, a topology element is associated with an Information Flow Center, the topology element is a central routing element. This may be, for example, a router, an L3 or L4 switch, but not a firewall. A topology element may be associated with an Information Controller, an Information Flow Center, or both.

If these attributes are assigned to the corresponding topology elements, the logical information flows from the given topology may be extracted automatically before the risk analysis is performed. In this case, the following approach is adopted:

1. A depth-first and/or breadth-first search, DFS and/or BFS, is performed over the topology elements of a predefined type starting from all topology elements affected.
   a) The DFS or BFS in this case may firstly search for an Information Flow Center. The search may be terminated if an Information Flow Center is not found within a predefined number of steps.
   b) If the DFS or BFS encounters an Information Flow Center, the information flow control rules, for example the rules of a firewall, are read out. It is then examined whether the previously assumed course may be performed under the rules collected in the course of the DFS or BFS. If this is not the case, the DFS or BFS is terminated.
   c) If the DFS or BFS encounters a topology element, it is examined whether the assumed course may be performed under the rules collected in the course of the DFS or BFS. If this is not the case, the DFS or BFS is terminated. If this is the case, a new topology element of a type previously defined for information flows is generated. This topology element is associated accordingly with all topology elements on the found path of the DFS or BFS.

The DFS or BFS is performed until the combination of all topology elements of the predefined type have been examined in respect of their validity.

Figure 3:
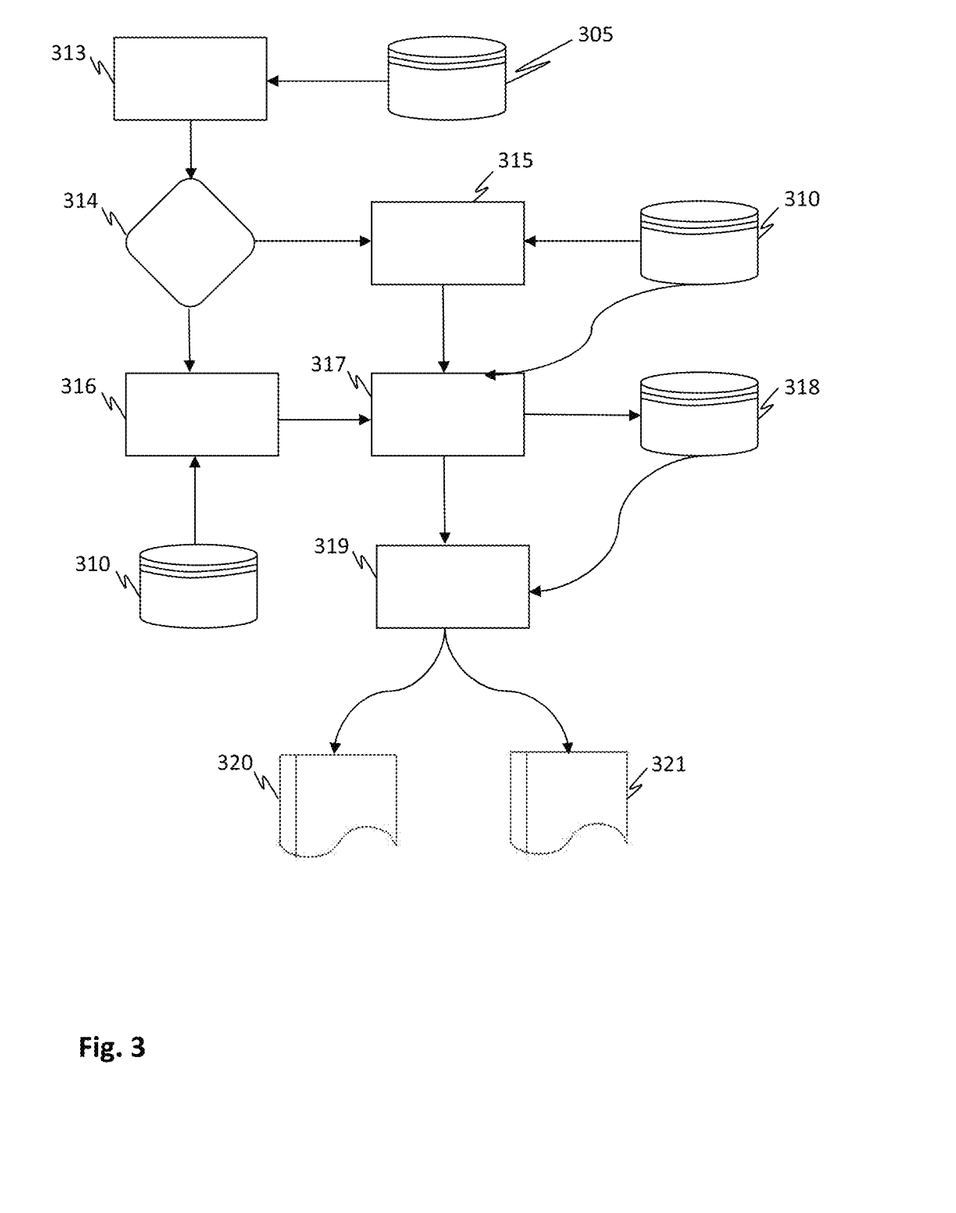
FIG. 3: illustrates a schematic sequence of an exemplary embodiment of a method for automatically evaluating information security risks.

FIG. 3 now shows an exemplary sequence of an automated evaluation of an information security risk. In order to perform the risk evaluation, in the present case the attack logic information 305 and the topology information 310 are provided in the form of databases. The risk evaluation in the present case is performed in an automated manner and may be executed by the user at regular intervals, both with changes to the attack logic information 305 and/or the topology information 310, or on an ad hoc basis.

In the present case a graph describing the attack logic 305 is first read out from the corresponding database, and each attack origin of the logic obtained is selected; step 313. For each of these attack origins, it is now examined whether it is associated with one or more topology elements or only with one topology element type; step 314. If an attack origin is associated with one or more topology elements, linked attack steps in the attack origin are performed on the corresponding topology element of the topology information 310; step 315.

If the attack origin is merely associated with one topology element type, in the present case all topology elements of the type in question are first called up from the topology information 310, and then the attack steps associated with the attack origin are performed on the obtained topology elements; step 316. If the attack step indicates that the subsequent (intermediate) goal relates to the topology element of the current iteration, it is examined whether the (intermediate) goal may be applied to the topology element of the current iteration; step 317.

If, however, the attack step does not relate to the topology element of the current iteration, the type to which the attack step relates is determined. The element associated with the topology element of the current iteration is then called up from the database 310. It is now examined whether the (intermediate) objectives linked with the attack step may be applied to the corresponding element; step 317. If a (intermediate) goal is associated with a damage event, it is examined whether the topology element of the current iteration corresponds to one of the topology elements associated with the damage event. If this is the case, an attack path is created, the last element of which represents the damage event and the first element of which represents the attack step associated with the attack origin.

The attack path thus includes all (intermediate) goals, their attack steps which are required or presupposed for these goals, any applied logical operators of the attack logic, and affected topology elements. These resulting paths are stored as graphs in a database 318.

Lastly, the obtained attack paths from the database 318 would be run through in the present case with a DFS and/or BFS method from the relevant attack origins in order to perform the probability propagation, step 319. In this case, the probability of a (intermediate) goal is adapted with use of the previous (intermediate) goals for each (intermediate) goal contained in the attack paths with use of the stored rules of the probability class AND, OR or XOR. Similarly, the probability of materialization of the damage scenarios is determined by their underlying (intermediate) goals in the attack paths. Since the amount of damage of the damage scenarios, that is to say the damage severity index of a damage event, is already known, the corresponding risk class or the information security risk may thus be presented. For example, a risk profile 320 may thus be derived and may be presented in the form of a risk matrix and indicates the relevant risks for the topology. In addition, the obtained attack paths 321 may indicate which vulnerabilities are associated with which risk. This may be used for the selection and prioritization and also for the traceable and cost-effective design of a security architecture.

Figure 4:
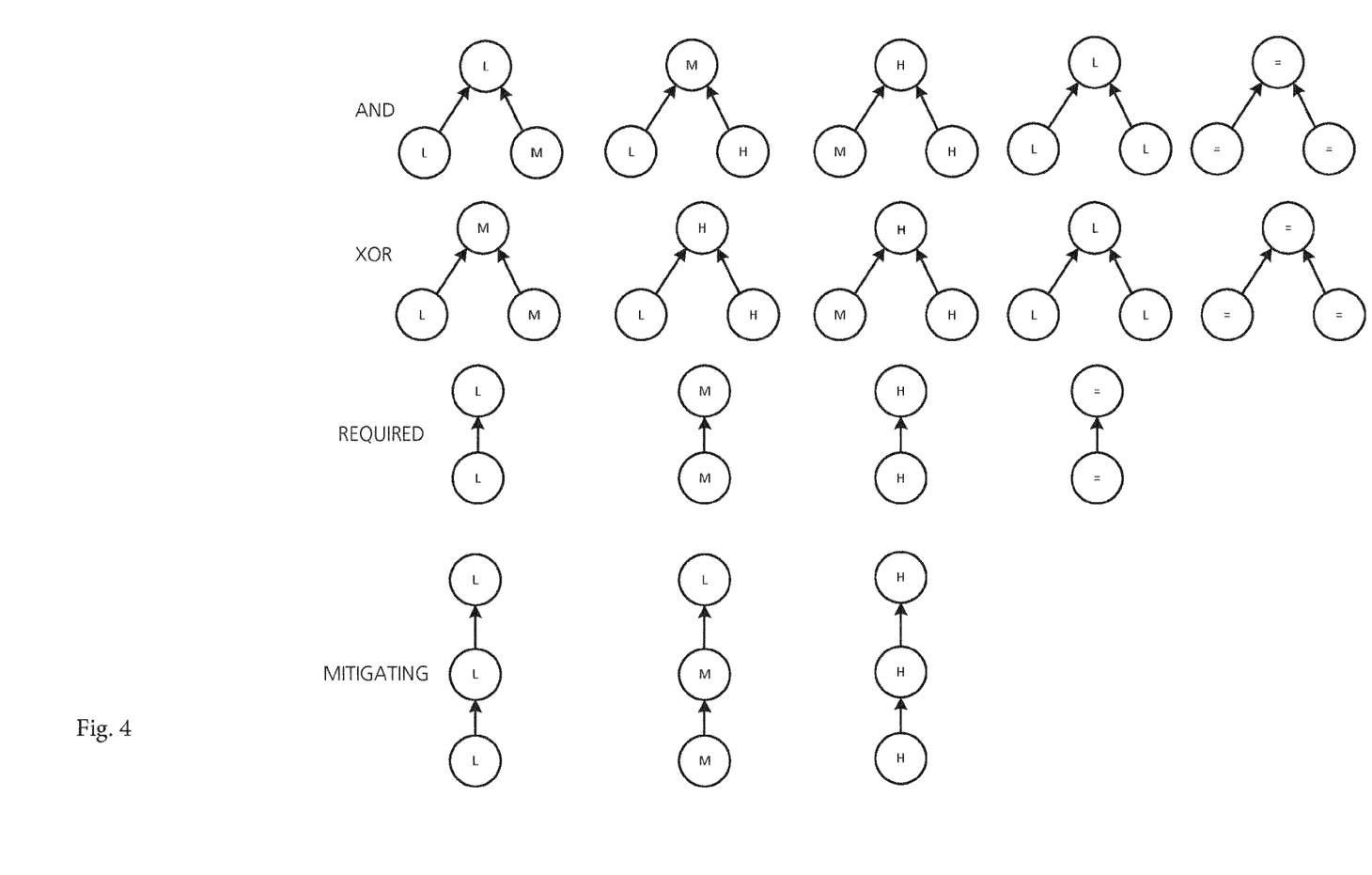
FIG. 4: illustrates an exemplary embodiment of a probability propagation.

FIG. 4 shows an exemplary embodiment of a probability propagation. The probability propagation in this example follows the maximum principle. A high probability in the previous attack step is thus granted a particularly high influence, and a security risk tends rather to be over-estimated than under-estimated. The probability classes in the present case are discretely specified, more specifically in this example as low probability L, medium probability M, and high probability H. The number of probability classes is thus limited to the number n, here 3, which provides a particularly clear classification. Different combinations for the different logical links, in the present case AND, XOR, REQUIRED and MITIGATING, are shown in the associated rows in FIG. 4.

The "AND" link is defined in the present case as shown in the first row: If the two probabilities linked via AND are L&M, L&H or M&H, this results in the probabilities L, M and H respectively—the high probability H thus increases a probability linked with it in comparison to the medium probability M. If he two linked probabilities are the same (column five), for example L (column four), the resulting probability is also the same. In this case, "=" shows in each instance that the probabilities of success of the contingent attack steps are the same; "=" thus corresponds in each instance to "L", "M" or "H".

In the case of the "XOR" link shown in row two, the higher probability is in each instance the result of the logic operation which leads to M, H and H as a result of the combination L&M, L&H and M&H respectively. Again, if the two linked probabilities are the same (column five), for example L (column four), the resulting probability is also the same.

A probability is left unchanged by the "REQUIRED" link, as shown in row three.

By means of the "MITIGATING" link, a probability is progressively mitigated by long chains of attack steps, in the present case from a chain length of two. The mitigation is achieved for the lowest and middle qualitative probability class (columns one and two), but not for the highest qualitative probability class (column three).

The probability propagation is thus defined in the present case such that probability categories or classes which do not represent the minimum L or maximum H of the available probability classes lead in combination to a progressive reduction of the probability classes, whereas for all further combinations the maximum principle of the probability of success of the preceding attack step applies. Furthermore, in this kind of probability propagation a progressive mitigation by long chains of attack steps is assumed and applies for the lowest (L) and middle (M), but not the highest (H) qualitative probability class.

The invention claimed is:

1. A method for automatically evaluating information security risks, comprising:
    (a) providing topology information which defines a plurality of specified topology elements, each having at least one of a number of specified properties, to an evaluation unit;
    (b) allocating at least one damage event having a specified severity of damage indicator value to at least one of the topology elements, the severity of damage indicator value representing a qualitative, ordinally scaled amount of damage associated with the damage event;
    (c) providing attack logic information, which defines a plurality of specified attack steps, to the evaluation unit, wherein the attack steps each relate to at least one of the plurality of specified properties and each comprise a probability of success and each attack step represents a manipulation which is performed in or on the corresponding topology element, in the presence or absence of the property of the topology element to which the attack step relates, wherein the probability of success represents a qualitative, ordinally scaled probability with which the achievement of an attack goal after the given attack step is expected;
    (d) choosing at least one of a plurality of specified probability propagation methods for combining the probabilities of success of attack steps that are linked with one another or interact with one another, the plurality of specified probability propagation methods comprising at least one of "AND" propagation, "OR" propagation, "XOR" propagation, "MITIGATING" propagation, and "REQUIRED" propagation; and
    (e) automatically evaluating an estimated information security risk by the evaluation unit, comprising the steps of:
        generating multiple attack paths on the basis of the provided topology information and the provided attack logic information, wherein an attack path links at least one topology element and a further topology element by at least one attack step, which relates to the specified properties of the topology elements in the attack path;

examining the generated attack paths to ascertain whether the attack path affects a topology element to which a damage event was allocated in method step (b), respectively;

in the event of a positive result of the examination: calculating, in accordance with the selected probability propagation method, an overall probability for the damage event depending on the probabilities of success of the attack steps; and outputting the estimated information security risk as proportional to a product of the calculated overall probability of the damage event and the severity of damage indicator value of the damage event, wherein the topology information is provided by an internal infrastructure independently and/or separately from the attack logic information, which is provided by an external infrastructure.

2. The method according to claim 1, wherein the topology information represents an information technology network, a cable harness, a building complex, a computer program network, and/or a product.

3. The method according to claim 1, wherein the properties of the topology elements represent a specified technical weak point, a type description, and/or a presence or absence of a specified security measure.

4. The method according to claim 1, wherein the topology information is processed by the evaluation unit in that, starting from the topology elements of a specified type, a depth-first and/or breadth-first search is performed over one or more other topology elements until all combinations with the topology elements of the specified type have been examined in respect of their validity under consideration of the attack logic information, wherein a combination is valid if the relevant topology elements in the combination are linkable via attack steps which in each instance relate to at least one of the properties of those topology elements linking them, and at the time of generation of the attack paths in step (e), the attack paths are generated in accordance with the valid combinations.

5. The method according to claim 1, wherein, to each attack step, an attack origin is allocated, which denotes which property a specific topology element of an attack path must have so that the corresponding attack step may be performed in or on the topology element and therefore may be linked with the specific topology element as part of the attack path; and an attack goal is allocated, which denotes which property a further topology element of the attack path must have so that the corresponding attack step may be linked with the further topology element as part of the attack path and/or which denotes which damage event must be allocated to the specific topology element so that the attack step may trigger the damage event with the allocated probability of success.

6. The method according to claim 1, wherein the automatic evaluation according to method step (e) is performed at specified intervals and/or once updated topology information has been provided and/or once updated attack logic information has been provided.

7. A computer program, comprising commands which, when the program is run by a computer, prompt the computer to perform step (e) according to claim 1.

8. A method for safeguarding an infrastructure, a building complex, and/or a computer program network, having the method steps according to claim 1, in combination with a safeguarding of the infrastructure.

9. The method according to claim 8, wherein the safeguarding comprises the steps of:

selecting at least one of the topology elements, the adaptation of which gives a maximum reduction of the evaluated information security risk; and indicating the selected topology element.

10. The method according to claim 8, wherein the safeguarding step comprises safeguarding the infrastructure on the basis of the output estimated information security risk or with an adaptation of the indicated topology element.

11. A system for automatically evaluating information security risks comprising:

a first provision unit for providing topology information which defines a plurality of specified topology elements each having at least one of a number of specified properties;

an allocation unit for allocating at least one damage event having a specified severity of damage indicator value to at least one of the topology elements, the severity of damage indicator value representing a qualitative ordinally scaled amount of damage associated with the damage event;

a second provision unit for providing attack logic information which defines a plurality of specified attack steps, wherein the attack steps in each instance relate to at least one of the plurality of specified properties and in each instance comprise a probability of success, wherein the probability of success represents a qualitative, ordinally scaled probability with which the achievement of an attack goal after the given attack step is expected;

a selection unit for choosing at least one of a plurality of specified probability propagation methods method for combining the probability of success of attack steps that are linked with one another or interact with one another, the specified pluralist of probability propagation methods comprising at least one of "AND" propagation, "OR" propagation, "XOR" propagation, "MITIGATING" propagation, and "REQUIRED" propagation; and an evaluation unit for automatically evaluating an estimated information security risk, which evaluation unit is designed to:

generate multiple attack paths on the basis of the topology information provided by the first provision unit and the attack logic information provided from the second provision unit, wherein an attack path links at least one topology element and a further topology element by at least one attack step which relates to the specified properties of the topology elements of the attack path and represents a manipulation which may be performed in or on the corresponding topology element in the presence or absence of the property of the topology element to which the attack step relates;

examine the generated attack paths to ascertain whether the attack path affects a topology element to which a damage event has been allocated, respectively;

in the event of a positive result of the examination, calculating, in accordance with the selected probability propagation method, an overall probability for the damage event depending on the probabilities of success of the attack steps; and outputting the estimated information security risk as proportional to a product of the calculated overall probability of the damage event and the severity of damage indicator value of the damage event, wherein the first provision unit is configured to provide the topology information by an internal infrastructure independently and/or separately from the second provision unit, which is configured to provide the attack logic information by an external infrastructure.

12. The system according to claim 11, wherein, to each attack step,
   an attack origin is allocated, which denotes which property a specific topology element of an attack path must have so that the corresponding attack step may be performed in or on the topology element and therefore may be linked with the specific topology element as part of the attack path; and
   an attack goal is allocated, which denotes which property a further topology element of the attack path must have so that the corresponding attack step may be linked with the further topology element as part of the attack path and/or which denotes which damage event must be allocated to the specific topology element so that the attack step may trigger the damage event with the allocated probability of success.

13. A method for automatically evaluating information security risks, comprising:
   (a) providing topology information which defines a plurality of specified topology elements, each having at least one of a number of specified properties, to an evaluation unit;
   (b) allocating at least one damage event having a specified severity of damage indicator value to at least one of the topology elements, the severity of damage indicator value representing a qualitative ordinally scaled amount of damage associated with the damage event;
   (c) providing attack logic information, which defines a plurality of specified attack steps, to the evaluation unit, wherein the attack steps each relate to at least one of the plurality of specified properties and each comprise a probability of success and each attack step represents a manipulation which is performed in or on the corresponding topology element, in the presence or absence of the property of the topology element to which the attack step relates, wherein the probability of success represents a qualitative, ordinally scaled probability with which the achievement of an attack goal after the given attack step is expected;
   (d) choosing at least one of a plurality of specified probability propagation methods for combining the probabilities of success of attack steps that are linked with one another or interact with one another, the specified pluralist of probability propagation methods comprising at least one of "AND" propagation, "OR" propagation, "XOR" propagation, "MITIGATING" propagation, and "REQUIRED" propagation; and;
   (e) automatically evaluating an estimated information security risk by the evaluation unit, comprising the steps of:
      generating multiple attack paths on the basis of the provided topology information and the provided attack logic information, wherein an attack path links at least one topology element and a further topology element by at least one attack step, which relates to the specified properties of the topology elements in the attack path;
      examining the generated attack paths to ascertain whether the attack path affects a topology element to which a damage event was allocated in method step (b), respectively;
      in the event of a positive result of the examination: calculating, in accordance with the selected probability propagation method, an overall probability for the damage event depending on the probabilities of success of the attack steps; and
      outputting the estimated information security risk as proportional to a product of the calculated overall probability of the damage event and the severity of damage indicator value of the damage event,
   wherein the topology information is provided independently and/or separately from the attack logic information, the topology information defining topology elements further including IT infrastructure and physical infrastructure provided to the evaluation unit.

14. The method according to claim 13, wherein the physical infrastructure comprises building infrastructure including a door.

* * * * *